J. T. DALTON & J. C. DANEKER.
KNOT TIER.
APPLICATION FILED OCT. 23, 1911.
1,041,039.
Patented Oct. 15, 1912.
4 SHEETS—SHEET 1.
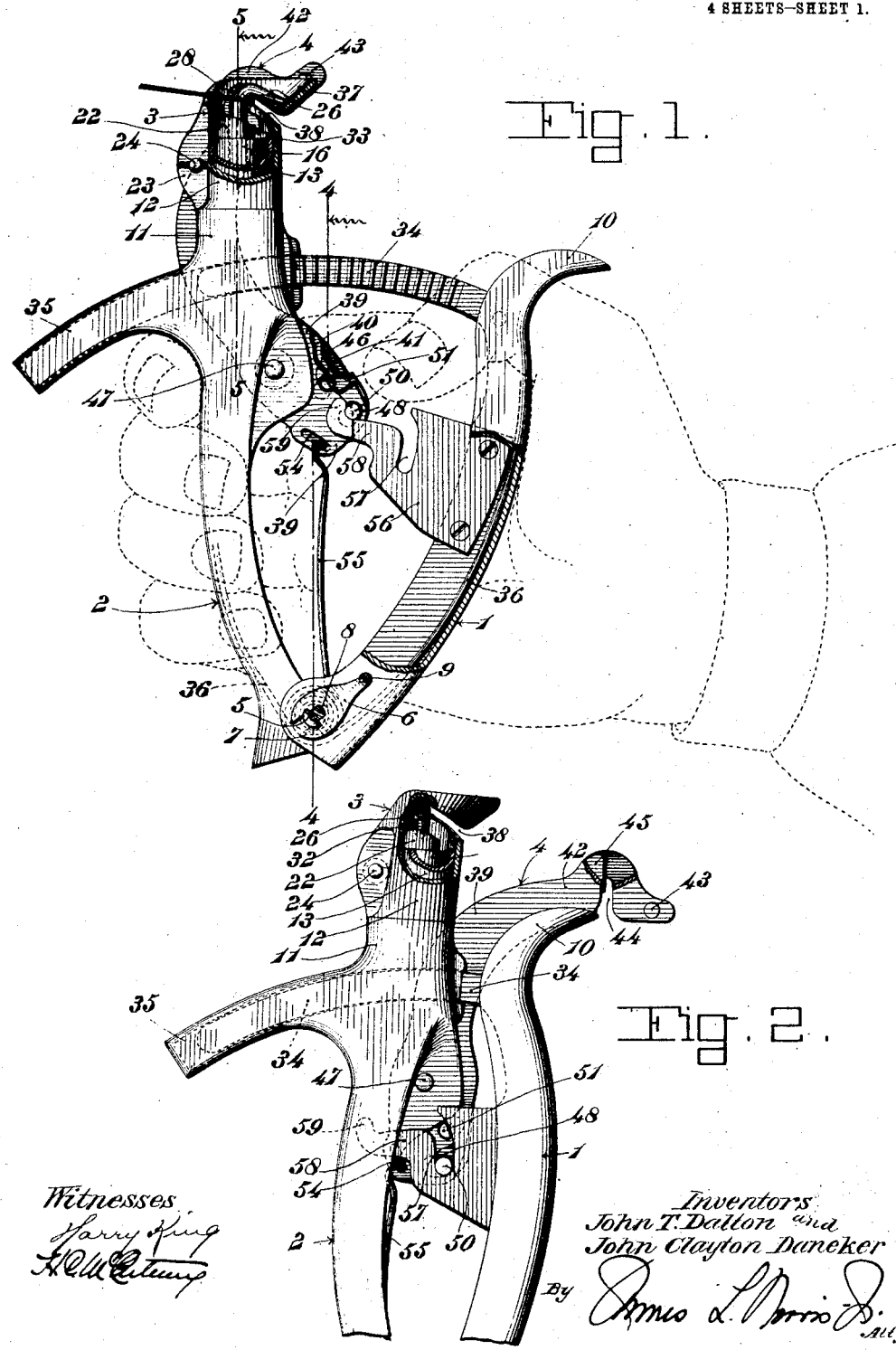

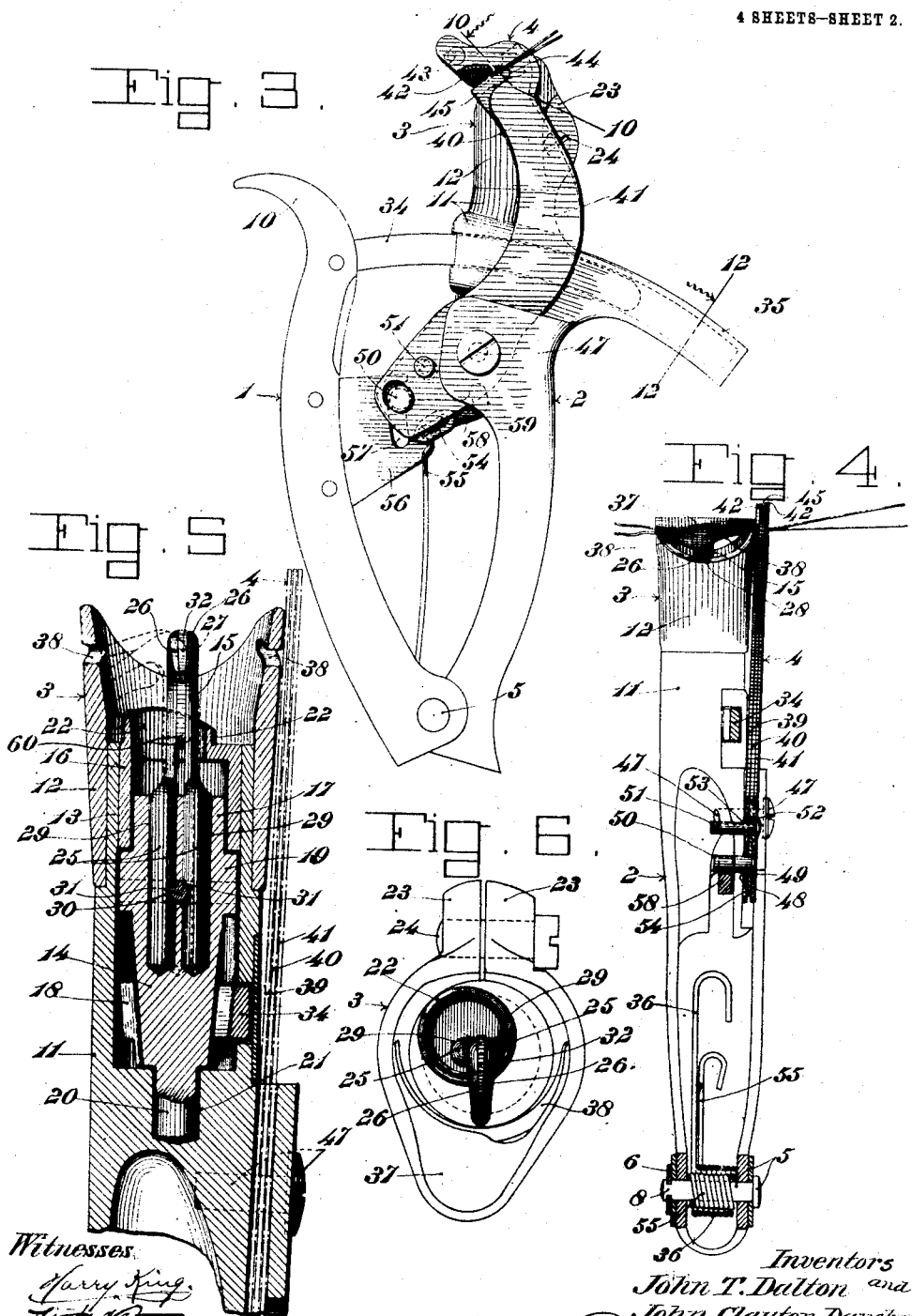

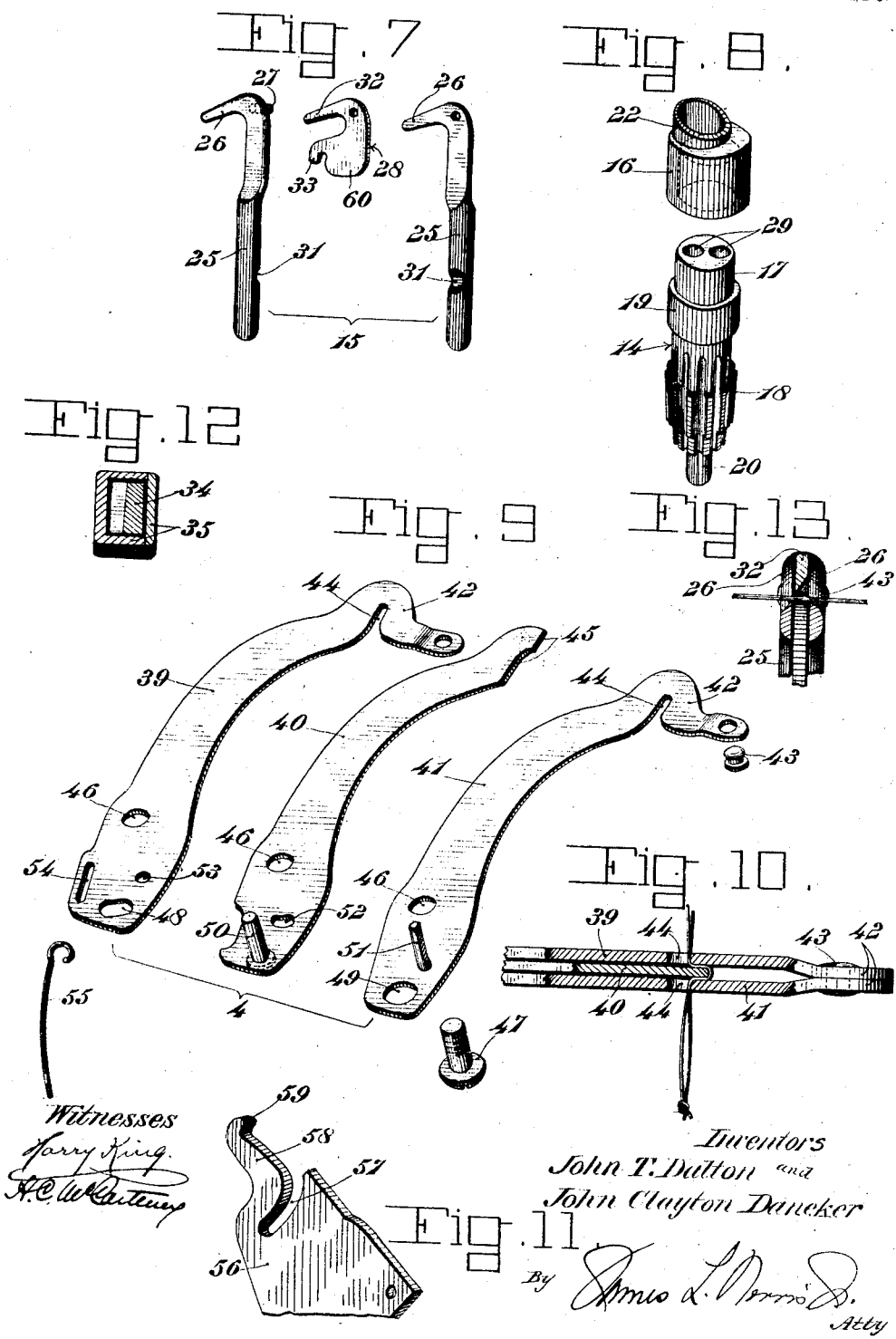

J. T. DALTON & J. C. DANEKER.
KNOT TIER.
APPLICATION FILED OCT. 23, 1911.
1,041,039.
Patented Oct. 15, 1912.
4 SHEETS—SHEET 4.
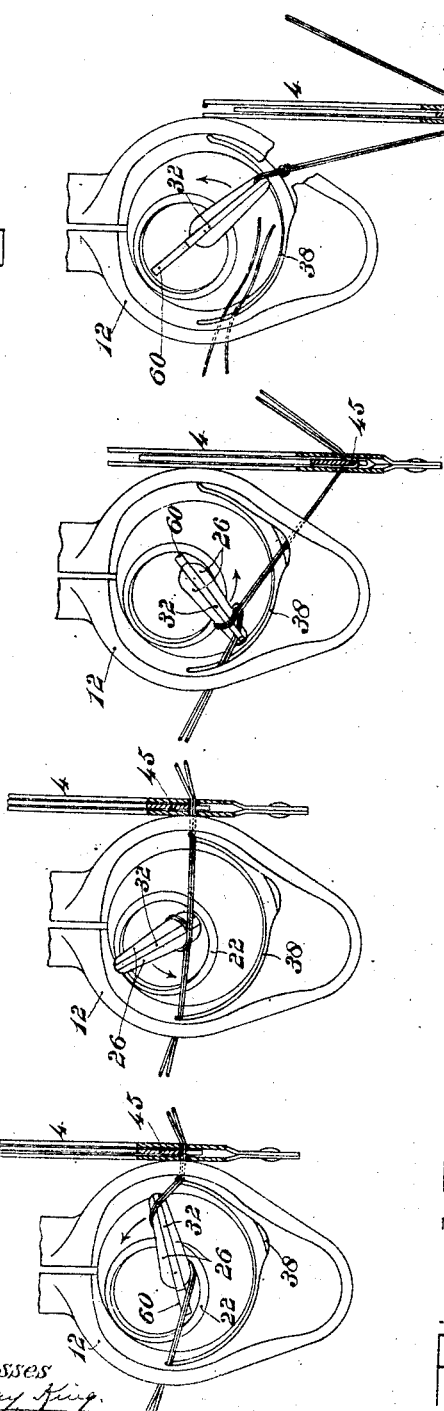
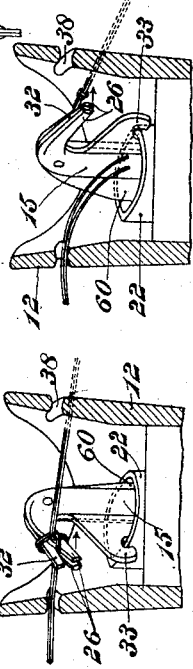
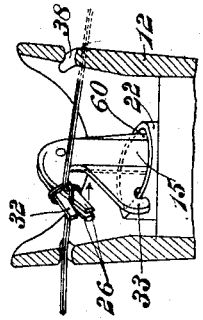
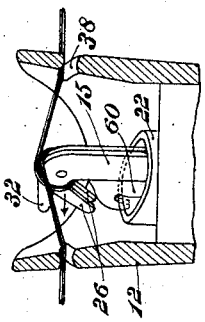
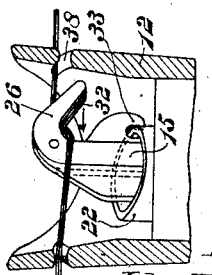
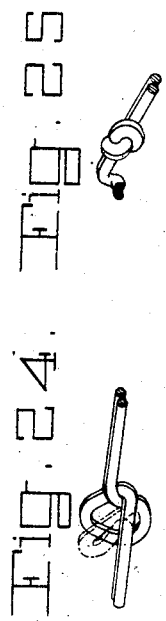
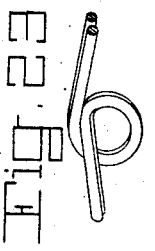
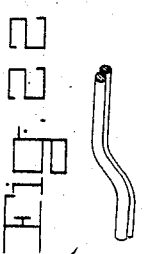
Witnesses
Inventors
John T. Dalton and
John Clayton Daneker
By James L. Norris
Atty.

UNITED STATES PATENT OFFICE.

JOHN T. DALTON AND JOHN CLAYTON DANEKER, OF BALTIMORE, MARYLAND.

KNOT-TIER.

1,041,039.  Specification of Letters Patent.  Patented Oct. 15, 1912.

Application filed October 23, 1911. Serial No. 656,259.

*To all whom it may concern:*

Be it known that we, JOHN T. DALTON and JOHN CLAYTON DANEKER, citizens of the United States, residing at Baltimore, in the State of Maryland, have invented new and useful Improvements in Knot-Tiers, of which the following is a specification.

This invention relates to knot-tiers, and its primary object is the production of an extremely simplified implement of the type specified which may be operated effectively and with equal facility with either hand, which does not require a special grip nor to be strapped or otherwise secured to the hand, and which can be readily taken apart to renew, repair or clean any or all of its component elements.

More especially, the invention comprehends certain improvements, hereinafter described at length, in or relating to the construction and mounting of the knotter and gripper elements, and in the devices employed for operating these elements.

A structural embodiment of the invention is illustrated in the accompanying drawings, whereof—

Figure 1 is a side elevation of the implement, with the parts thereof in normal or starting position; Fig. 2 is a similar view, showing the parts in closed position; Fig. 3 is a view similar to Figs. 1 and 2, showing the parts in intermediate position, certain portions of Figs. 1, 2 and 3 appearing in section; Fig. 4 is a vertical section on the line 4—4 of Fig. 1; Fig. 5 is an enlarged vertical section on the line 5—5 of Fig. 1; Fig. 6 is an enlarged plan view of the knotter element; Figs. 7, 8 and 9 are juxtaposed detail views, respectively, of the parts of the knotting bill, the carrier and the actuating element for said bill, and the gripper; Fig. 10 is an enlarged detail section through the knotter, on the line 10—10 of Fig. 3; Fig. 11 is a perspective view of the member for actuating the gripper; Fig. 12 is an enlarged transverse section on the line 12—12 of Fig. 3; Fig. 13 is an enlarged transverse section through the working parts of the bill; Figs. 14 to 17 are enlarged plan views of the knotter and gripper, the latter element appearing partly in section, showing the successive positions assumed during the operation of the implement; Figs. 18 to 21 are transverse vertical sections through the knotter; and Figs. 22 to 25 are fragmental perspective views depicting the various steps in the formation of the knot.

As shown in said drawings, the implement consists preferably of four essential parts or elements, namely, a pair of operating handles or levers 1 and 2, the knotter 3 and the gripper 4. The two levers referred to are of channel or U-section, and are bowed in opposite directions, so as to fit the hand of the operator and afford an easy grip; they are pivotally connected together at their lower ends to form a V by means of a removable pin or bolt 5 which is passed through alining perforations in said ends and is normally held against withdrawal by a suitable spring clip 6, here shown as in the form of a forked plate, the jaws 7 produced at one end of the plate by the formation of a slot therein engaging the notched end 8 of the pin, while the opposite end of said plate is provided with a tongue 9 that is received in a perforation in the lever 1. The free end of the lever 1 is formed with a rearwardly-curved guard 10, and that of the lever 2 with a cylindrical barrel 11 to which the knotter is detachably connected.

The knotter element preferably comprises a split sleeve or head 12 fitted upon the reduced neck 13 of the barrel 11, a carrier 14 for the bill 15, and an element 16 for actuating the movable part or member of the bill, as hereinafter described. The carrier, which is depicted in detail in Fig. 8, includes a cylindrical upper portion 17, a downwardly tapered peripherally-toothed lower portion 18 and an intermediate cylindrical portion or collar 19 of somewhat greater diameter than the portions 17 and 18, the lower end of the toothed portion 18 being formed with a reduced journal 20 which is received in a bearing opening 21 in the bottom of the barrel. The actuating element 16 is in the form of a sleeve whose lower portion fits in the space between the parts 13 and 17, and rests upon the upper face of collar 19; the upper wall of this element is formed with an open-ended eccentrically-located cam ring 22. The head or sleeve 12, at the point where it is split, is provided with outstanding perforated ears 23 which are forced toward each other, in the usual manner, by a clamping screw 24, so as to hold the sleeve in place upon the barrel neck. The bill 15 comprises a pair of counterpart shafts 25 whose upper portions are flattened and bent to produce the usual jaws 26, one of these jaws being provided with a lateral pin 27 which passes through alining perforations in the other jaw and the severing plate 28, the latter being interposed between said jaws in the usual manner. The bill shafts are received in spaced parallel openings 29 in the carrier 14 and are held against longitudinal movement by a cross-pin 30 that is passed through a transverse opening in said carriage and is engaged in seats or recesses 31 in the sides of said shafts. The severing plate is provided at its upper end with the usual sharpened jaw 32, which co-acts with the jaws 26, and its lower or wing portion 60 is formed with a hook 33 which extends across and over the upper portion of the cam ring 22.

Means is provided for rotating the carrier 14 and the bill 15, to actuate the latter and the severing plate, the independent movement of said plate being effected, as will be understood, through the agency of the cam ring and the hook 33. Such means, in the present instance, comprises an arcuate rack 34 which is secured at one end to lever 1, and projects at its opposite end through an opening in barrel 11 into engagement with the teeth 18 formed on the carriage. To permit the full movement of the rack, the opening just referred to extends completely through the barrel, and the latter is provided at one side with an arcuate guard housing 35 which is arranged in alinement with the rack and which said rack enters completely when the levers are forced together, so as to prevent it from coming into contact with the hand or fingers of the operator, the said levers being normally separated by a suitable spring 36 whose arms bear against them. It will be apparent, therefore, that when the implement is gripped, the two levers will be moved toward each other, and the meshing of the teeth on the rack and carrier will produce a rotation of the latter and, in consequence, of the bill, the severing plate being rocked upon its pivot 27 during this movement by reason of the co-action between hook 33 and ring 22. To permit the introduction of the ends of the threads into position for engagement by the bill, the upper portion of the knotter head is provided with a lip 37 that projects toward lever 1 and is formed with a curved slot 38 having one end thereof enlarged.

The gripper element 4, which serves to clamp the ends of the threads in place during the knotting and severing operations, and to withdraw the tied threads from the knotter after the conclusion of the latter operation, preferably consists of a series of three juxtaposed levers 39, 40 and 41, the outer levers 39 and 41 being of counterpart construction and provided at their upper ends with laterally-curved bills 42 which are fastened together by a rivet 43. At the inner ends of these bills, the levers 39 and 41 are slotted, as at 44, the slots alining and producing a passage across which the curved end or beak 45 of the central lever 40 moves, when that lever is actuated. Adjacent their lower terminals, the gripper levers are formed with alining perforations 46 through which a pivot bolt 47 is passed, the threaded inner end of said bolt being fitted in an opening in the lower portion of barrel 11, the gripper being so disposed that the bills 42 move forward and backward past the enlarged end of the lip slot 38. At their extreme lower ends, the outer levers 39 and 41 are provided with elongated slots 48 and 49, and the central lever with a lateral pin 50, the shank of said pin passing through the slot 48, while its head extends into the slot 49, as shown in Figs. 1 and 3. Lever 41 is also provided with a lateral pin 51 which extends through a slot 52 and an opening 53 formed, respectively, in the lower portions of the levers 39 and 40 between the lower terminals thereof and the pivot openings 46; (see Fig. 9); the pin 51 is designed to fit snugly in opening 53, but to have play in slot 52, and, in like manner, the shank and head of pin 50 are designed to move freely in openings 48 and 49, thus providing for a movement of lever 40 relative to levers 39 and 41. Lever 39 is finally provided with a slot 54 located between openings 46 and 48, said slot having engaged therein the bent upper end of one arm of a spring 55 whose other arm bears against lever 2; spring 55 serves to hold the gripper normally in operative position.

In order to operate the gripper, there is provided an element which, in the construction illustrated, is constituted by a cam plate 56 secured to lever 1. Said plate, as shown in Fig. 11, is formed with an outwardly-curved slot 57 and with a forwardly-curved arm 58, the latter terminating in an up-bent finger or shoulder 59. The location of this plate with respect to pins 50 and 51 is such that when the levers 1 and 2 are forced together said pins will successively enter slot 57 and cause, first, a rocking movement of lever 40 relative to levers 39 and 41 to move the beak 45 of said lever 40 across passage 44, and, second, a bodily rocking movement of the entire gripper. During this operation, the forward pin 50 travels along the upper edge of arm 58 and across slot 57, until it strikes against the upper end of the curved rear wall of said slot. As the closing movement of the main levers 1 and 2 continues, pin 50 is caused to enter into and travel down the slot, thereby causing the above-mentioned independent movement of lever 40 and, subsequently, a slow bodily rocking movement of the gripper, (toward the left, with respect to Figs. 1 and 3). As this rocking movement of the gripper continues, the rear pin 51 reaches the upper end of slot 57, and since this pin is located above and slightly to one side of pin 50, its entrance into said slot will cause the last half of the rocking movement of the gripper to take place comparatively rapidly. In the normal position of the gripper, the passage 44 lies directly at the side of the slot 38, and for this reason the ends of the threads to be tied together are initially passed through both said slot and said passage.

The complete operation of the device is as follows, the various positions assumed by the different parts during the effective, or closing, movement of the main levers being depicted in Figs. 14 to 21, and the several steps in the formation of the knot in Figs. 22 to 25. The ends of the threads to be tied together are passed from right to left through the passage 44 and slot 38, and the aforementioned levers are then forced toward each other. As the rack 34 moves through its housing 35, the engagement of its teeth with the toothed or gear portion 18 of the carrier 14 will cause the latter, and, with it the bill 15, to rotate counter-clockwise. This movement of the bill causes its nose to engage the threads, as depicted in Figs. 14 and 18, and, as the movement continues, to form the loop in said threads indicated in Figs. 15, 19 and 23. The hook 32 on the severing plate 28 is, during the first part of this movement, traveling on the lower part of the cam ring 22, and the jaw 32 on said plate is disposed, in consequence, wholly within the space between the two jaws 26; but during the second part thereof, as the bill assures the position shown in Figs. 15 and 19, said hook reaches the high part of the cam, and the severing plate is rocked, with the result that jaw 32 moves upwardly out of said space. When the bill reaches the third position, depicted in Figs. 16 and 20, the then elevated severing jaw extends across the left-hand portion of the threads, and is about to descend and cut the latter. At the same time, the initial movement of the gripper takes place, and the right-hand portion of the threads is clamped in passage 44 by the action of beak 45 on the central gripper lever 40, that portion of said threads being, also, carried forward by the rocking movement of the gripper due to the entrance of pin 50 into the slot 57 in cam plate 56. When the bill leaves the position shown in Figs. 16 and 20, hook 33 again rides on the low portion of the cam ring, causing jaw 32 to descend and sever the threads slightly to the left of the loop.

In its descent, said jaw carries the ends of the loop into the space between the jaws 26 and clamps the same therein, and, as the bill continues its movement, the loop is withdrawn from the nose thereof by the gripper and the clamped ends are drawn through the loop, as depicted in Fig. 24, thus completing the formation of the knot. All parts are then in the position shown in Figs. 17 and 21, the bill having completed a revolution. Finally, as the gripper reaches the limit of its forward movement, its central lever is returned to its original position by the action of the pins in the cam slot, thereby re-opening the passage 44 and releasing the tied threads. When the pressure upon the main levers is released, all parts are restored to their initial positions under the stress of the springs 36 and 55, the return movement being checked by the contact of pin 50 with finger 59.

With reference to the operation of the severing plate, it may be stated that the wing 60 formed thereon fits within the ring 22 and that since the latter is mounted eccentrically on sleeve 16, the rotation of the bill by which said plate is carried will cause hook 33 to be maintained in contact with the cam edge of said ring.

From an inspection of Figs. 1, 2 and 3, it will be seen that the shape of the two main levers is such that the implement can be readily gripped and operated with either hand and with equal facility, and, further, that the implement can be reversed, so that the fingers will directly engage either main lever.

It will also be observed that the implement can be readily taken apart by merely loosening the binding screw 24 and removing the bolts 5 and 47, and that the several parts of the main elements may themselves be removed when necessary, either for cleaning purposes or for substitution of new parts.

We claim as our invention:

1. A knot-tying implement comprising, in combination, a pair of pivotally-connected levers; a knotter and a gripper carried by one of said levers; means carried by the other lever for operating said knotter; and a cam carried by said other lever for operating said gripper.

2. A knot-tying implement comprising, in combination, a pair of pivotally connected levers; a rotatable knotter and a rocking gripper carried by one of said levers; and separate rack and cam elements carried by the other lever for operating said knotter and said gripper, respectively.

3. In a knot-tying implement, the combination, with a pair of operating levers, and a knotter carried by one lever; of a movable gripper carried by said lever; coöperating means carried by the gripper and the other lever for imparting a relatively slow initial movement and a relative rapid subsequent movement to said gripper; and additional means carried by said other lever for operating said knotter.

4. In a knot-tying implement, the combination of a pair of coöperating levers bowed in opposite directions to fit the hand of the operator and pivoted directly together at their lower ends to form a V, whereby the implement may be gripped and operated with either hand, or reversed; means for normally forcing said levers away from each other; a gripper and a knotter carried by one of said levers; and separate elements carried by the other lever for operating said knotter and said gripper.

5. In a knot-tying implement, the combination of a pair of coöperating levers bowed in opposite directions to fit the hand of the operator and pivoted directly together at their lower ends to form a V, each of said levers being provided with an outturned guard adjacent its upper end, whereby the implement may be gripped and operated with either hand, or reversed; means for normally forcing said levers away from each other; a gripper and a knotter carried by one of said levers; and separate elements carried by the other lever for operating said knotter and said gripper, one of said operating elements being arranged in alinement with the guard on the first-named lever, to enter said guard when said levers are forced together.

6. In a knot-tying implement, the combination of a pair of coöperating pivotally-connected levers adapted to be gripped in the hand of the operator: means for normally forcing said levers away from each other; a knotter and a gripper carried by one of said levers; separate elements carried by the other lever for operating said knotter and said gripper; and a hollow outwardly-extending guard carried by the first-named element and arranged in alinement with one of said operating elements, to receive that element therein when said levers are forced together.

7. A knot-tying implement comprising, in combination, a pair of oppositely-bowed levers pivotally connected at their lower ends, one of said levers being provided adjacent its upper end with a laterally-projecting guard housing; a rotatable knotter mounted on said lever; and a laterally-projecting operating element for said knotter is conected to the other element in alinement with said housing, for movement completely thereinto when said levers are forced together.

8. A knot-tying implement comprising, in combination, a pair of oppositely-bowed levers pivotally connected at their lower ends, one of said levers being provided adjacent its upper end with a laterally-projecting guard housing; a rotatable knotter mounted on said lever; a laterally-projecting operating element for said knotter connected to the other element in alinement with said housing, for movement completely thereinto when said levers are forced together; a gripper connected to the first-named lever; and an operating element for said gripper connected to the second-named lever.

9. In a knot-tying implement, the combination, with a pair of operating levers, and a knotter carried by one lever; of a movable gripper carried by said lever and provided with a pair of projections; a member carried by the other lever and arranged to successively engage said projections, for imparting a relatively slow initial movement and a relatively rapid subsequent movement to said gripper; and an additional member carried by the second-named lever for operating said knotter.

10. In a knot-tying implement, the combination, with a pair of operating levers, and a knotter carried by one lever; of a movable gripper carried by said lever and provided with a pair of lateral pins; a cam secured to the other lever and arranged to successively engage said pins, for imparting a relatively slow initial movement and a relatively rapid subsequent movement to said gripper; and an additional member carried by the second-named lever for operating said knotter.

11. In a knot-tying implement, the combination, with a pair of operating levers, and a knotter carried by one lever; of a movable gripper carried by said lever and provided with a pair of lateral pins; a cam secured to the other lever and formed with an outwardly-opening slot arranged to successively receive said pins, for imparting a relatively slow initial movement and a relatively rapid subsequent movement to said gripper; and an additional member carried by the second-named lever for operating said knotter.

12. In a knot-tying implement, the combination, with a pair of operating levers, and a knotter carried by one lever; of a movable gripper carried by said lever and provided with a pair of lateral pins; a cam secured to the other lever and provided with an arm along which one of said pins is adapted to travel, and with an outwardly-opening slot arranged to successively receive both pins, for imparting a relatively slow initial movement and a relatively rapid subsequent movement to said gripper; and an additional member carried by the second-named lever for operating said knotter.

13. In a knot-tying implement, the combination, with a pair of operating levers, and a knotter carried by one lever; of a gripper carried by said lever and comprising a series of juxtaposed interconnected members; co-operating means carried by the other lever and said gripper for initially moving one of said members relative to the other members, and for subsequently swinging said gripper bodily in one direction; and additional means carried by said other lever for operating said knotter.

14. In a knot-tying implement, the combination, with a handle, and a knotter carried thereby; of a gripper carried by said handle and comprising juxtaposed interconnected outer and inner members, the outer members being provided with a thread passage; operating means for said gripper, to initially swing the inner member in one direction relative to said outer members and close said passage, to subsequently swing the gripper bodily in one direction, and to return said inner member to its original position and reopen said passage at the conclusion of such swinging movement; and means for operating said knotter.

15. In a knot-tying implement, the combination, with a handle provided with a barrel, and a tubular head connected to said barrel in axial alinement therewith; of a rotatable carrier disposed within said barrel and head and provided with an upper apertured portion and a lower toothed portion; a bill mounted in the apertures in the first-named portion of the carrier; and a toothed member engaged with the second-named portion of said carrier for rotating the latter and said bill.

16. In a knot-tying implement, the combination, with a handle provided with a barrel, and a tubular head connected to said barrel in axial alinement therewith; of a rotatable carrier disposed within said barrel and head and provided with an upper apertured portion and a lower toothed portion; a sleeve fitted within said head and encircling the first-named portion of the carrier; an eccentrically-arranged ring mounted upon the upper wall of said sleeve and formed with a cam edge; a bill mounted in the apertures in said first-named portion of said carrier and provided with a movable severing jaw and with a wing projecting into said ring and having a hook engaging said ring edge; and a toothed member engaged with the second-named portion of said carrier for rotating the latter and said bill.

17. In a knot-tying implement, the combination of a pair of oppositely-bowed levers pivotally connected together at their lower ends, one of said levers being formed at its upper end with a barrel; a tubular head clamped upon said barrel in axial alinement therewith; a rotatable knotter disposed within said head and barrel; a laterally-projecting member secured to the other lever and engaged with said knotter, for rotating the same when said levers are forced toward each other; and means for normally forcing said levers apart.

18. In a knot-tying implement, the combination of a pair of operating levers, one of which is provided with a barrel; a tubular head clamped on said barrel in axial alinement therewith and formed with a thread-receiving slot; a rotatable knotter mounted within said head and barrel and including a bill movable with relation to said slot; a gripper pivoted to said barrel and provided with a thread-receiving passage alining with said slot, said gripper including a movable member adapted to clamp a thread in said passage; and means for operating said knotter and gripper.

In testimony whereof we have hereunto set our hands in presence of two subscribing witnesses.

JOHN T. DALTON.
JOHN CLAYTON DANEKER.

Witnesses:
SAML. F. STYERS,
CHAS. H. GERWIG.

---

Copies of this patent may be obtained for five cents each, by addressing the "Commissioner of Patents, Washington, D. C."